US009048754B2

(12) United States Patent
Revelant et al.

(10) Patent No.: US 9,048,754 B2
(45) Date of Patent: Jun. 2, 2015

(54) SYSTEM AND METHOD FOR OFFSETTING THE INPUT VOLTAGE UNBALANCE IN MULTILEVEL INVERTERS OR THE LIKE

(75) Inventors: Alessandro Revelant, Germona del Friuli (IT); Piero Stocco, Martignacco (IT); Roberto Petrella, Tavagnacco (IT); Nicola Buonocunto, Reggio Emilia (IT); Giorgio Maldini, Montecchio Emilia (IT)

(73) Assignee: METASYSTEM ENERGY S.R.L., Reggio Emilia (IT)

( * ) Notice: Subject to any disclaimer, the term of this patent is extended or adjusted under 35 U.S.C. 154(b) by 584 days.

(21) Appl. No.: 13/502,958

(22) PCT Filed: Oct. 12, 2010

(86) PCT No.: PCT/IB2010/002597
§ 371 (c)(1),
(2), (4) Date: Jul. 20, 2012

(87) PCT Pub. No.: WO2011/048457
PCT Pub. Date: Apr. 28, 2011

(65) Prior Publication Data
US 2012/0281442 A1    Nov. 8, 2012

(30) Foreign Application Priority Data

Oct. 20, 2009   (IT) .............................. MO2009A0256

(51) Int. Cl.
H02M 7/44         (2006.01)
H02M 7/5387       (2007.01)
(Continued)

(52) U.S. Cl.
CPC ..................................... *H02M 7/487* (2013.01)

(58) Field of Classification Search
CPC ...... H02M 7/48; H02M 7/487; H02M 7/5387
USPC .................. 363/16–17, 39–43, 55–58, 95–98, 363/131–132
See application file for complete search history.

(56) References Cited

U.S. PATENT DOCUMENTS 5,361,196 A * 11/1994 Tanamachi et al. ............. 363/41
5,467,262 A * 11/1995 Nakata et al. ................... 363/41
(Continued)

FOREIGN PATENT DOCUMENTS

JP           7-79574        3/1995

OTHER PUBLICATIONS

Liu, Hyo L., et al. "DSP Based Space Vector PWM for Three- Level Inverter with DC-Link Voltage Balancing." *IECON*. 1991. pp. 197-203.

(Continued)

*Primary Examiner* — Timothy J Dole
*Assistant Examiner* — Ivan Laboy Andino
(74) *Attorney, Agent, or Firm* — Stein IP LLC

(57) ABSTRACT

The system for offsetting the input voltage unbalance in multilevel inverters or the like comprises a control unit operatively associated with a multilevel inverter for converting direct current into alternate current, the control unit being suitable for piloting the multilevel inverter for generating an output current depending on a reference current, and an equalization unit for equalizing the input voltages of the multilevel inverter having first generation means of a harmonic component of order equal to the reference current, out of phase with respect to the fundamental component of the reference current, detection means of the unbalance of the input voltages to the multilevel inverter, regulation means of the amplitude of the harmonic component depending on the detected unbalance, for offsetting the unbalance. The method for offsetting the unbalance of the input voltages in multilevel inverters or the like comprises a control phase of a multilevel inverter for converting direct current into alternate current, in which the multilevel inverter is piloted for generating an output current depending on a reference current, a generation phase of a harmonic component of order equal to the reference current, out of phase with respect to the fundamental component of the reference current, a detection phase of the unbalance of the input voltages to the multilevel inverter and a regulation phase of the amplitude of the harmonic component depending on the detected unbalance, for offsetting the unbalance.

20 Claims, 5 Drawing Sheets

(51) Int. Cl.
  *H02M 1/12* (2006.01)
  *H02M 7/487* (2007.01)

(56) References Cited

U.S. PATENT DOCUMENTS

| | | | |
|---|---|---|---|
| 5,506,765 A * | 4/1996 | Nakata et al. | 363/98 |
| 5,627,742 A * | 5/1997 | Nakata et al. | 363/98 |
| 6,842,354 B1 | 1/2005 | Tallam et al. | |
| 7,495,938 B2 | 2/2009 | Wu et al. | |
| 8,570,776 B2 * | 10/2013 | Kolar et al. | 363/40 |
| 2006/0245216 A1 * | 11/2006 | Wu et al. | 363/13 |
| 2008/0298103 A1 * | 12/2008 | Bendre et al. | 363/89 |

OTHER PUBLICATIONS

International Search Report issued in International Application No. PCT/IB2010/002597 on Feb. 14, 2011.

* cited by examiner

SYSTEM AND METHOD FOR OFFSETTING THE INPUT VOLTAGE UNBALANCE IN MULTILEVEL INVERTERS OR THE LIKE

CROSS-REFERENCE TO RELATED APPLICATIONS

This application is a national phase of PCT International Patent Application No. PCT/IB2010/002597, filed Oct. 12, 2010, and claims priority to Italian Patent Application No. MO2009A000256, filed Oct. 20, 2009, in the Italian Intellectual Property Office, the disclosures of which are incorporated herein by reference.

BACKGROUND OF THE INVENTION

1. Field of the Invention

The present invention relates to a system and a method for offsetting the input voltage unbalance of condenser benches in multilevel inverters or similar devices.

2. Description of the Related Art

The use is known and has been common for some time of electronic apparatus so-called "inverters" suitable for converting a direct input current into an alternate output current.

The applications of inverters are numerous and go, e.g., from the use in UPS units for the conversion of direct current from a power battery, to use in industry for adjusting the speed of electric motors or, again, to use for the conversion of electricity coming from production plants such as, e.g., photovoltaic plants, before introduction into the power distribution network.

A particular type of inverter is the multilevel inverter, so-called NPC (Neutral Point Clamped), which is able to supply more than two levels of power voltage at output so as to generate a wave shape as close as possible to a sinusoid shape. By way of example, FIG. 1 shows the general diagram of a three-phase, triple-level NPC inverter.

At the input to an NPC inverter, several condensers are commonly used in series to split up the total power voltage and create the voltage levels required to generate the output voltage.

The inverter of FIG. 1, in particular, has an input branch composed of two condensers C of the same capacity in series the one with the other and associated with a power voltage source $V_{dc}$ in correspondence to a terminal with positive power voltage $V_{dc}+$, to a terminal with negative power voltage $V_{dc}-$ and to a neutral point NP (Neutral Point) between the two condensers C.

The inverter shown in FIG. 1 comprises three electronic power switching units, such as Mosfet, IGBT or similar devices, indicated by the references $S_{a1}$ $S_{b1}$ $S_{c1}$ $S_{d1}$ $S_{a2}$ $S_{b2}$ $S_{c2}$ $S_{d2}$ and $S_{a3}$ $S_{b3}$ $S_{c3}$ $S_{d3}$, which are suitably connected together on three branches, one for each phase f1, f2 and f3.

The inverter also comprises three pairs of diodes, indicated in FIG. 1 by the references $D_{a1}$ and $D_{b1}$, $D_{a2}$ and $D_{b2}$, $D_{a3}$ and $D_{b3}$ respectively.

With reference to the branch relating to the phase f1, e.g., the diodes $D_{a1}$ and $D_{b1}$ are arranged in series the one with the other and connect the neutral point NP to the connection point between the switches $S_{a1}$ and $S_{b1}$ and to the connection point between the switches $S_{c1}$ and $S_{d1}$ respectively.

The diodes $D_{a2}$, $D_{b2}$, and $D_{b3}$ are similarly connected with the branches relating to the phases f2 and f3.

By commanding the closing of the switches $S_{a1}$ $S_{b1}$ $S_{c1}$ $S_{d1}$, $S_{a2}$ $S_{b2}$ $S_{c2}$ and $S_{d2}$ and $S_{a3}$ $S_{b3}$ $S_{c3}$ $S_{d3}$ each of the phases can be connected to the positive of the voltage $V_{dc}+$, to the negative of the voltage $V_{dc}-$ and to the node NP (Neutral Point) with intermediate voltage compared to $V_{dc}+$ and $V_{dc}-$.

The quick switching of the switches between the possible configurations is performed by means of suitable modulation techniques, so as to obtain an alternate voltage and output current on the three phases, starting with the direct power voltage $V_{dc}$.

The operation of these multilevel inverters of NPC type, single or multiphase, does however have a number of drawbacks.

In particular, during operation, a voltage unbalance can occur on the benches of condensers C at its input, conventionally known as "DC bus voltages".

The condensers C, in fact, can charge and discharge to a different extent according to the conduction time window of the different components, thereby producing output voltages of different amplitude.

The equalization of the CD bus voltages during inverter operation can be performed using different systems and methods of known type.

A first known method, e.g., envisages the use of electronic circuits in addition to the inverter, suitable for balancing, moment per moment, the voltage at the heads of the two condensers C on the input branch.

Such electronic circuits of known type, however, are not without their drawbacks.

In fact, these electronic circuits are of the dissipative type, because the equalization is partially achieved by dissipating the excess energy present on one of the two condensers C and loading the other of the condensers C through the power voltage source $V_{dc}$ at input.

Furthermore, this equalization method requires the insertion of additional circuit elements which increase the costs and the overall complexity of the system. A second equalization method of known type, on the other hand, envisages the use of suitable methods of modulation of the inverter switches.

These methods however are not without drawbacks either.

Their use, in fact, considerably increases the complexity of the system because, in particular when three-phase converters are used, they can only be implemented by means of the coordinated operation of the three groups of inverters on the three output branches.

A further known equalization method envisages the use of two independent power voltage sources, realizable by means of two distinct DC supply units or by means of a so-called "symmetric booster".

This method too however implies a greater complexity and a higher cost of the system.

Finally, another equalization method of known type envisages the supply of a direct mains current able to unbalance the powers absorbed by the two condensers C, thus permitting the equalization of the two DC bus power voltages.

This equalization method also has problems tied in particular to the applicable standards regulating the connection to the power mains network, which indicate very stringent limits for the supply of a direct component in the mains.

The document JP 07 079574 discloses a control circuit for three-level inverter provided with means for adding an harmonic component of the fundamental frequency of the inverter to the output voltage of each phase of the inverter and means for detecting the voltage unbalance of the DC bus voltage and for deciding the amplitude of the harmonic component to be added to the output.

The document U.S. Pat. No. 7,495,938 discloses three-level inverter and rectifier power conversion systems and space vector modulation controls having even-order harmonic elimination for neutral voltage balancing with a predefined vector switching sequences for half-wave symmetry in open loop system operation.

The document U.S. Pat. No. 6,842,354 discloses a power converter including a DC to AC inverter wherein to compensate for a voltage imbalance across the capacitors, an imbalance compensation coefficient is derived from the difference in voltages across the first and second capacitors of the DC bus voltage and the imbalance compensation coefficient is employed to adjust the width of the output pulses so as to charge and discharge the capacitors to correct the imbalance.

The document identified with the NPL (Non-Patent Literature) reference number XP 010042112, titled "DSP based space vector PWM for three-level inverter with DC-link voltage balancing" (IECON, NE, vol. CONF. 17, 28 Oct. 1991) discloses a PWM method for three-level inverter wherein each voltage vector on space vector plane is classified in relation to charging discharging action of DC capacitors and wherein a modulation method is defined based on the voltage vector selection principle.

SUMMARY OF THE INVENTION

The main aim of the present invention is to provide a system and a method for offsetting the input voltage unbalance in a multilevel inverter or the like, which allow overcoming the mentioned drawbacks of the state of the art.

Another object of the present invention is to provide a system and a method for offsetting the input voltage unbalance in a multilevel inverter or the like which allow overcoming the mentioned drawbacks of the state of the art within the ambit of a simple, rational, easy and effective to use as well as low cost solution.

The above objects are achieved by the present system for offsetting the input voltage unbalance in multilevel inverters or the like, comprising at least a control unit operatively associated with at least a multilevel inverter for converting direct current into alternate current, said control unit being suitable for piloting said multilevel inverter for generating at least an output current depending on at least a reference current, characterized by the fact that it comprises at least an equalization unit for equalizing the input voltages of said multilevel inverter having:
  first generation means of at least a harmonic component of order equal to said reference current, out of phase with respect to the fundamental component of said reference current;
  detection means of the unbalance of the input voltages to said multilevel inverter;
  regulation means of the amplitude of said harmonic component depending on me detected unbalance, for offsetting said unbalance.

The above objects are all achieved by the present method for offsetting the unbalance of the input voltages in multilevel inverters or the like, comprising at least a control phase of at least a multilevel inverter for converting direct current into alternate current, in which said multilevel inverter is piloted for generating at least an output current depending on at least a reference current, characterized by the fact that it comprises the following phases:
  generation of at least a harmonic component of order equal to said reference current, out of phase with respect to the fundamental component of said reference current;
  detection of the unbalance of the input voltages to said multilevel inverter;
  regulation of the amplitude of said harmonic component depending on the detected unbalance, for offsetting said unbalance.

BRIEF DESCRIPTION OF THE DRAWINGS

Other characteristics and advantages of the present invention will become more evident from the description of a preferred, but not sole, embodiment of a system and a method for offsetting the unbalance of the input voltage in multilevel inverters or the like, illustrated purely as an example but not limited to the annexed drawings in which.

DETAILED DESCRIPTION OF THE EMBODIMENTS

Figure 1:
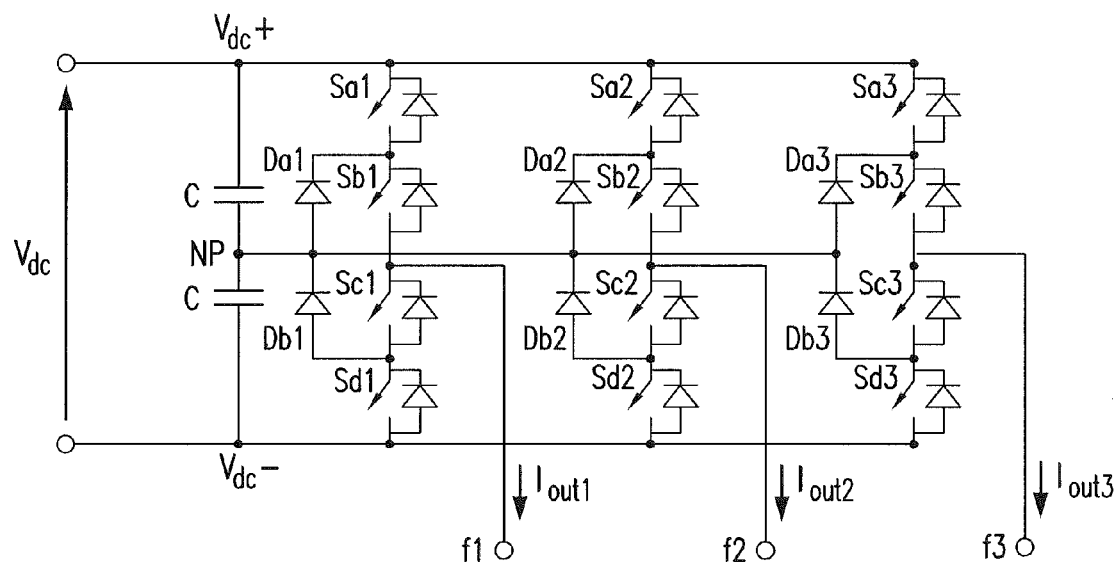
FIG. 1 is a general diagram of a conventional three-phase triple-level NPC inverter.
Figure 2:
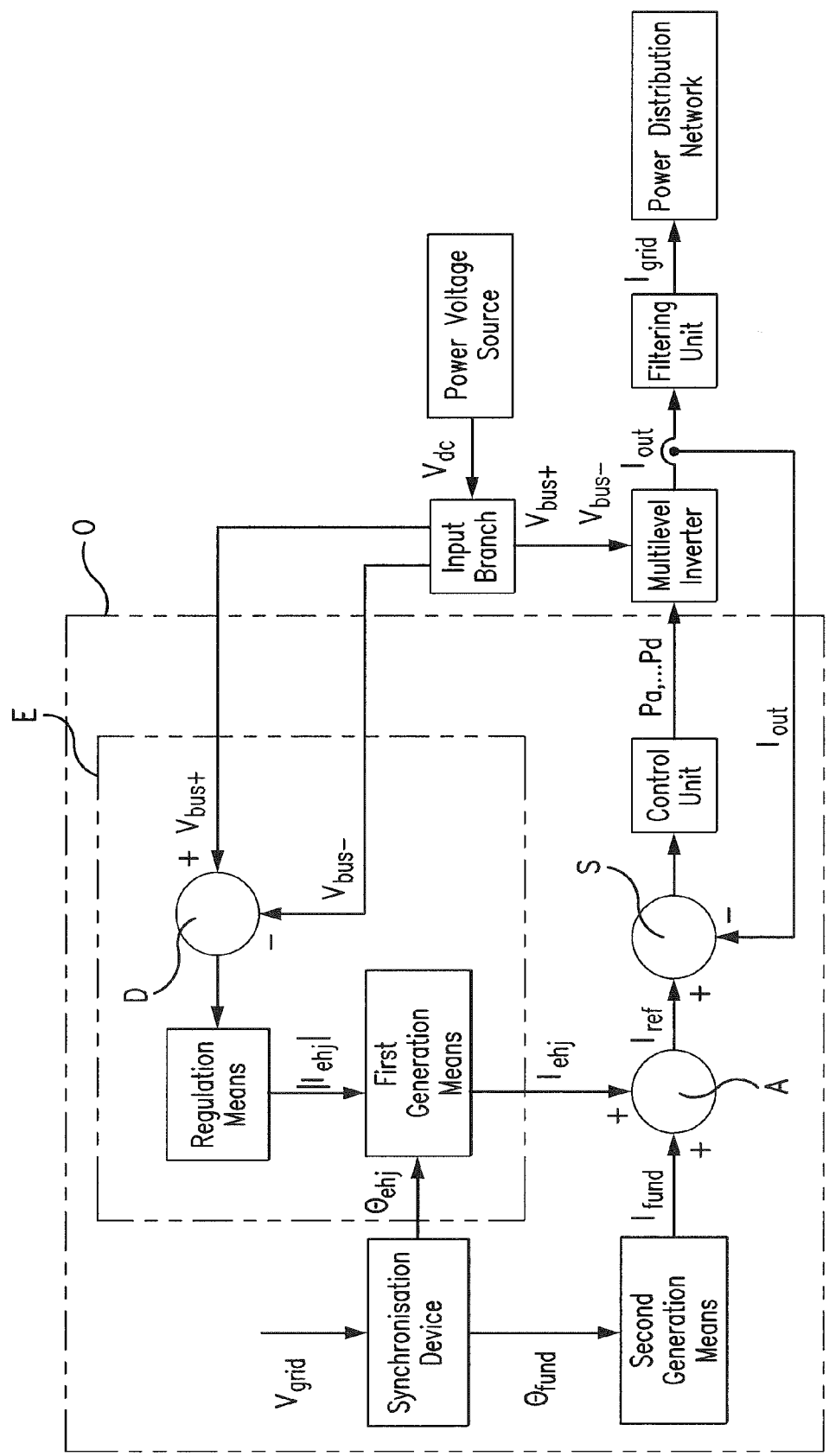
FIG. 2 is a general block diagram of the system according to the invention.

With particular reference to FIG. 2, globally indicated by O is a system for offsetting the input voltage unbalance of condenser benches in multilevel inverters or similar device.

Usefully, the system O can be applied to a multilevel inverter of the conventional type and can be used in numerous common-type applications such as, e.g., the conversion of the direct current produced by photovoltaic modules or the conversion of the direct current produced by a battery inside UPS units. In particular, the system O is associated with a unit for the conversion of direct current into alternate current comprising a multilevel inverter I and an input branch B connected to the inverter and to a power voltage source PW made up, e.g., of a power generator.

A filtering unit F, made by means of a filter type LC, LCL or the like, is arranged downstream of the multilevel inverter I and is connected to a sinusoid alternate current power distribution grid G.

Figure 3:
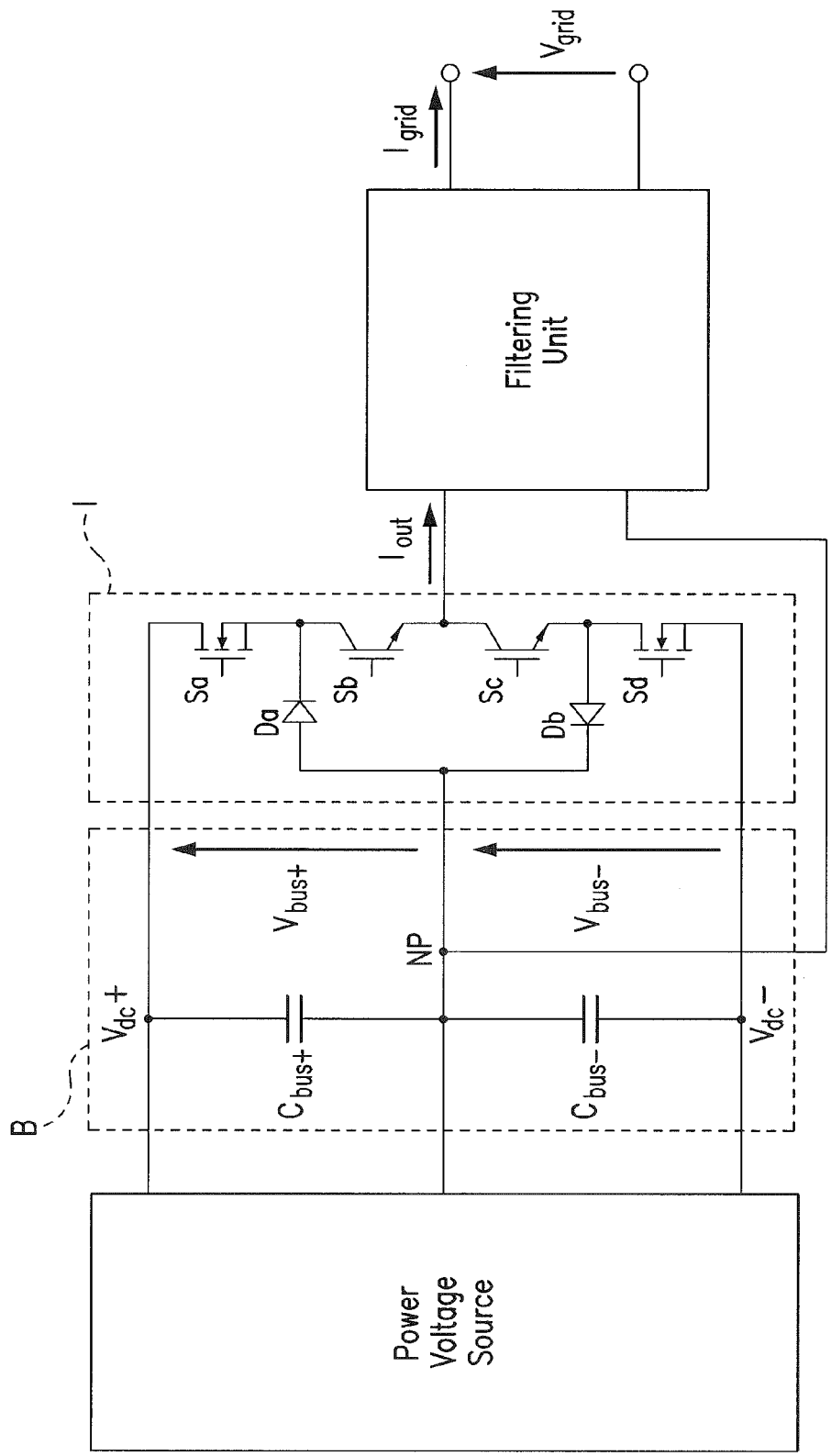
FIG. 3 is a circuit diagram showing a possible embodiment of a unit for the conversion of direct current into alternate current according to the invention.

With particular reference to the embodiment shown in FIG. 3, the multilevel inverter I is of the type of a NPC (Neutral Point Clamped) inverter, single-phase with three voltage levels. Different embodiments cannot however be ruled out in which an inverter is used with more than three voltage levels and/or of the multiphase type.

Always with reference to the embodiment shown in FIG. 3, furthermore, the input branch B is made up of two condensers $C_{bus+}$ and $C_{bus-}$ connected in series the one to the other and has the two opposite terminals connected to the positive pole $V_{dc}+$ and to the negative pole $V_{dc}-$ of the PW power voltage source respectively.

It must also be pointed out that the condensers $C_{bus+}$ and $C_{bus-}$ shown in the FIG. 3 can be representative of the series and/or of the parallel of several condensers made physically to achieve the necessary total capacity.

The connection point between the two condensers $C_{bus+}$ and $C_{bus-}$, indicated in the FIG. 3 by the reference NP, is the neutral point of the multilevel inverter I wherein the voltage is intermediate with respect to $V_{dc}+$ and to $V_{dc}-$.

The input voltages to the multilevel inverter I, commonly known as "DC bus voltages" are composed of the voltages $V_{bus+}$ and $V_{bus-}$ present at the heads of the condensers $C_{bus+}$ and $C_{bus-}$ respectively.

The system O comprises a control unit U, operatively associated with the multilevel inverter I and suitable for piloting this multilevel inverter to generate at least an alternate output current $I_{out}$, produced according to a reference current $I_{ref}$.

More specifically, the control unit U pilots the multilevel inverter I so as to generate an output current $I_{out}$, the wave shape of which reproduces the wave shape of the reference current $I_{ref}$.

The multilevel inverter I, in particular, comprises a first and a second electronic switch $S_a$ and $S_b$ connected in series the one to the other between the positive pole $V_{dc}+$ and an output terminal, and a third and a fourth electronic switch $S_c$ and $S_d$ connected in series between the negative pole $V_{dc}-$ and the output terminal.

Each of the switches $S_a$, $S_b$, $S_c$ and $S_d$ is operatively associated with the control unit U.

In particular, the control unit U comprises generation means of four distinct control signals $P_a$, $P_b$, $P_c$, $P_d$, pulse wave modulated and suitable for controlling the first, the second, the third and the fourth switch $S_a$, $S_b$, $S_c$ and $S_d$ respectively.

The use cannot however be ruled out of control signals of the switches $S_a$, $S_b$, $S_c$ and $S_d$ modulated by means of different pulse modulation methods.

Usefully, these switches $S_a$, $S_b$, $S_c$ and $S_d$ can be made up of Mosfet, IGBT or other static switching devices.

The multilevel inverter I also has a first diode $D_a$ and a second diode $D_b$.

The first diode $D_a$ has the anode connected to the input branch B in correspondence to the neutral point NP and the cathode connected to the connection point between the first switch $S_a$ and the second switch $S_b$, while the second diode $D_b$ has the cathode connected to the input branch B, in correspondence to the neutral point NP, and the anode connected to the connection point between the third switch $S_c$ and the fourth switch $S_d$.

Usefully, the first and the second diode $D_a$ and $D_b$ and the diodes associated in anti-parallel with the switches $S_a$, $S_b$, $S_c$ and $S_d$, not shown in FIG. 3 being of known type, can be diodes with silicon substrate or SiC (Silicon Carbide) substrate, which allow a reduction of the switching losses.

Advantageously, the system O comprises an equalization unit, indicated generally in FIG. 2 by the reference E, suitable for offsetting the input voltage unbalance $V_{bus+}$ and $V_{bus-}$.

In particular, the equalization unit E comprises first generation means G1 suitable for generating at least a harmonic component $I_{ehj}$ of order equal to the reference current $I_{ref}$ e.g., a second order harmonic component, suitably out of phase with respect to the fundamental component $I_{fund}$ of the reference current itself.

The equalization unit E also comprises detection means D associated with the input branch B, suitable for detecting the unbalance of the input voltages $V_{bus+}$ and $V_{bus-}$ and regulation means R for adjusting the amplitude $|I_{ehj}|$ of the harmonic component $I_{ehj}$ according to the unbalance detected, for the offsetting of the unbalance itself.

This way, an output current $I_{out}$ is set by the multilevel inverter I which has an even harmonic component, e.g., a second order harmonic component $I_{out}"$ suitably out of phase with respect to the fundamental component $I_{out}'$ and the amplitude of which is regulated by the equalization unit E according to the unbalance between the input voltages $V_{bus+}$ and $V_{bus-}$ detected at the heads of the condensers $C_{bus+}$ and $C_{bus-}$.

Consequently, the mains current $I_{grid}$ coming from the filter F and injected into the power distribution network G also presents an even harmonic component, e.g., a second order harmonic component $I_{grid}"$, suitably out of phase with respect to the fundamental component $I_{grid}$ and the amplitude of which is regulated by the equalization unit E according to the unbalance between the input voltages $V_{bus+}$ and $V_{bus-}$ detected at the heads of the condensers $C_{bus+}$ and $C_{bus-}$.

The even harmonic component $I_{out}"$ of the output current $I_{out}$, once filtered by the filter F and injected into the power distribution network G, establishes an unbalance between the powers $P_{bus+}$ and $P_{bus-}$ absorbed by the two condensers $C_{bus+}$ and $C_{bus-}$ and, consequently, it can be used to perform the equalization between the input voltages $V_{bus+}$ and $V_{bus-}$.

Figure 7:
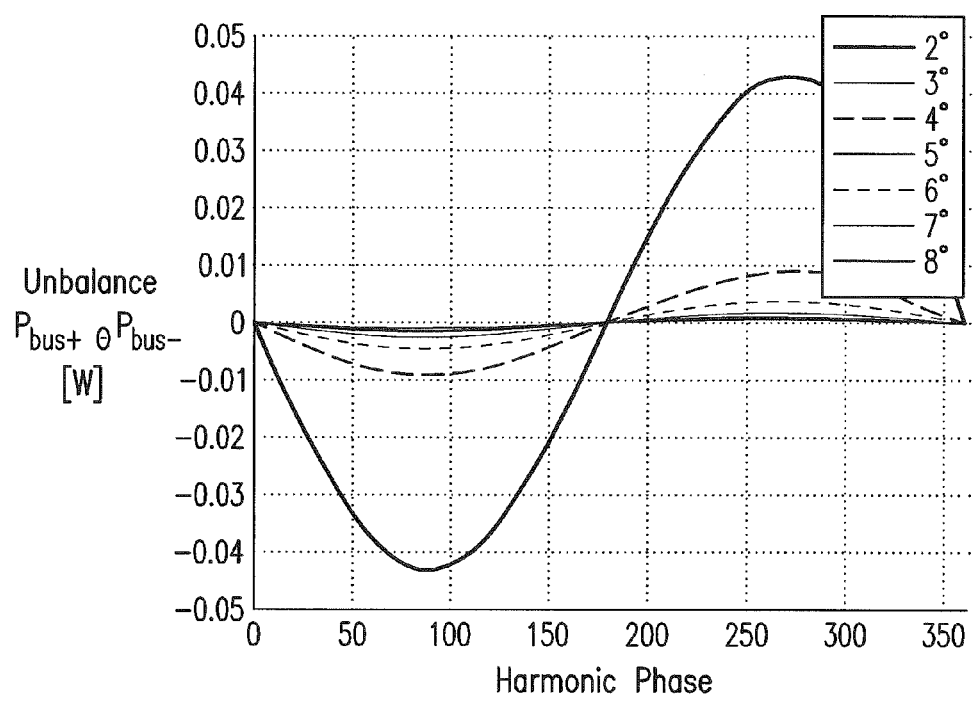
FIG. 7 is a graph showing, by way of example, possible patterns of the unbalance of the average powers on the two condensers according to the harmonics of the mains current of an order above the first, wherein the amplitude of the harmonic components of the mains current is equal to 20% of the amplitude of the fundamental component.

In a preferred embodiment of the system O, the even harmonic component $I_{out}"$ of the output current $I_{out}$ is in quadrature with the fundamental component $I_{out}'$, so as to increase the offsetting action of the unbalance, the amplitude of such harmonic component being equal, as shown by the graphs of FIG. 7.

The use cannot however be ruled out of harmonic components $I_{out}"$ of the output current $I_{out}$ with a different out-of-phase angle with respect to the fundamental component $I_{out}'$.

The detection means D, in particular, are associated with the input branch B and are composed of a device for calculating the difference between the input voltages $V_{bus+}$ and $V_{bus-}$.

Usefully, the first generation means G1 are suitable for generating a sinusoid harmonic component $I_{ehj}$ out of phase with respect to the fundamental component $1_{fund}$. In particular, the out-of-phase angle of the harmonic component $I_{ehj}$ with respect to the fundamental component $I_{fund}$ can be changed but, in a preferred embodiment, it is equal to 90°+ k*180°, with k equal to any whole number.

By way of example, the illustrations 4 and 5 show the voltage, current and mains power patterns $V_{grid}$, $I_{grid}$ and $P_{grid}$ in the case in which the harmonic component $I_{ehj}$ of the reference current $I_{ref}$ and consequently the harmonic component $I_{grid}"$ of the mains current $I_{grid}$, is a second order harmonic component, 90° out of phase with respect to the fundamental component $I_{fund}$ and with an amplitude $|I_{ehj}|$ equal to 20% of the amplitude of the fundamental component itself.

Figure 4:
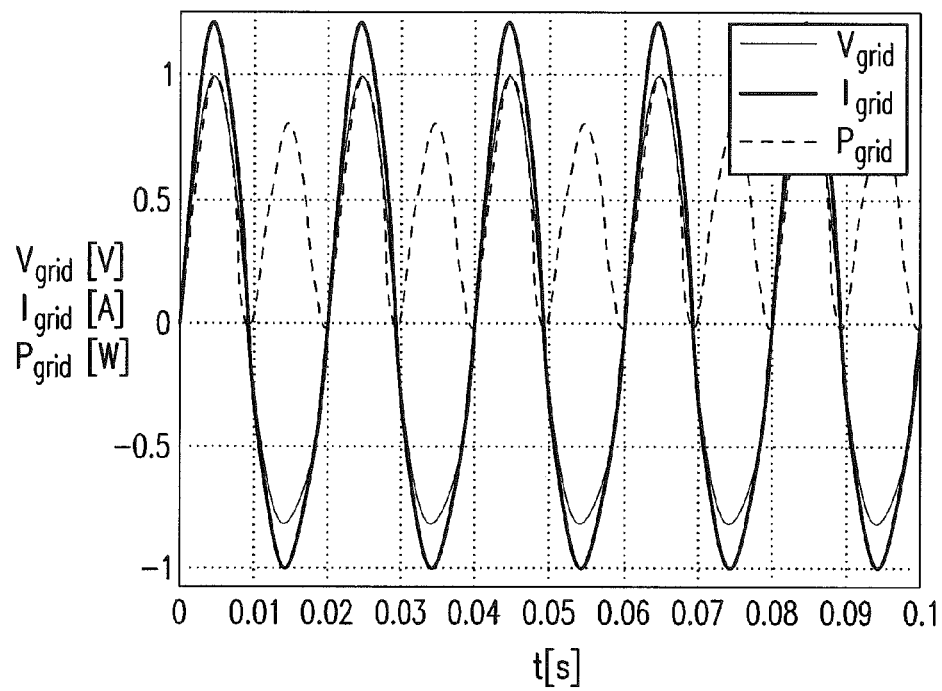
FIG. 4 is a graph showing, by way of example, possible voltage, current and mains power patterns generated by the conversion unit according to the invention and injected into a power distribution network.

In particular, FIG. 4 graphically shows the voltage, current and mains power patterns $V_{grid}$, $I_{grid}$ and $P_{grid}$ generated by the multilevel inverter I, filtered by the filter F and injected into the power distribution network G.

Figure 5:
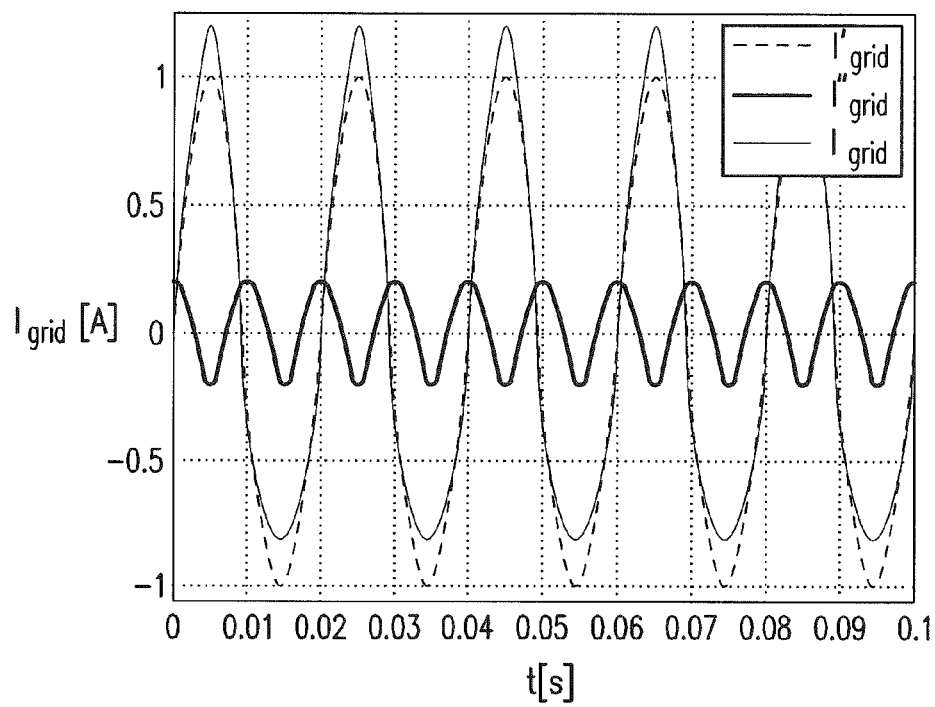
FIG. 5 is a graph showing, by way of example, possible patterns of the total mains current injected into the power distribution network and of the respective fundamental component and second order harmonic component.

FIG. 5 on the other hand shows in detail the patterns of the total mains current $I_{grid}$ injected into the power distribution network and of the respective fundamental component $I_{grid}'$ and second order harmonic component $I_{grid}''$.

Figure 6:
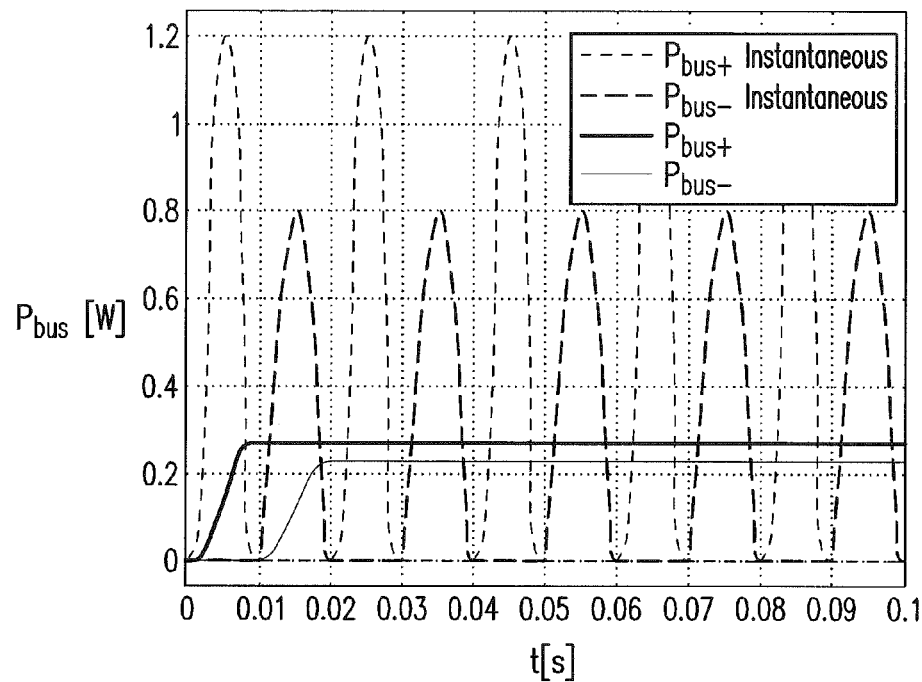
FIG. 6 is a graph showing, by way of example, possible patterns of the instantaneous and average powers absorbed by the condensers at the input of a multilevel inverter of the conversion unit, in the case of the injection into the power distribution network of a harmonic component of the second order mains current, 90° out of phase and with an amplitude equal to 20% with respect of the fundamental component of the mains current.

FIG. 6, also shows, by way of example, the instantaneous and average patterns of the powers $P_{bus+}$ and $P_{bus-}$ absorbed by the condensers $C_{bus+}$ and $C_{bus-}$ at the input of the multilevel inverter I, in the case of the injection into the power distribution network of a harmonic component $I_{grid}''$ of the second order mains current $I_{grid}$, 90° out of phase with respect to the fundamental component $I_{fund}$ and with an amplitude $|I_{ehj}|$ equal to 20% of the amplitude of the fundamental component itself.

It thus appears evident that the presence of the harmonic component $I_{grid}''$ in the output current $I_{grid}$ has, as its effect, a different value of the powers $P_{bus+}$ and $P_{bus-}$ absorbed by the two condensers $C_{bus+}$ and $C_{bus-}$ and this allows, therefore, using the equalization unit E to achieve a controlled unbalance between the two input voltages $V_{bus+}$ and $V_{bus-}$.

FIG. 7 shows the unbalance patterns of the powers $P_{bus+}$ and $P_{bus-}$ on the two condensers $C_{bus+}$ and $C_{bus-}$ according to the phase with respect to the fundamental component $I_{grid}'$ and to the change in the harmonics of the mains current $I_{grid}$ of an order above the first.

It can therefore be seen that no unbalance is produced of the input voltages $V_{bus}+$ and $V_{bus-}$ either in the case wherein odd order harmonics of the output current $I_{grid}$, are injected into the sinusoidal power distribution network G or in the case wherein the phase displacement of the harmonics is zero or in phase opposition with the fundamental component $I_{grid}'$.

It is also noticed that the effect of unbalance on the input voltages $V_{bus+}$ and $V_{bus-}$ drops as the order of the even harmonics increases.

The equalization by means of the O system of the unbalance of the input voltages $V_{bus+}$ and $V_{bus-}$, therefore, can be performed in an optimum way when the harmonic component $I_{grid}''$ of the mains current $I_{grid}$ is a second order harmonic component and it is 90° out of phase with respect to the fundamental component $I_{fund}$.

The system O also comprises second generation means G2 of the fundamental component $I_{fund}$ of the reference current $I_{ref}$ and an adding device A, associated with the first generation means G1 and with the second generation means G2 and suitable for adding the fundamental component $I_{fund}$ and the harmonic component $I_{ehj}$ to obtain the reference current $I_{ref}$.

Usefully, the system O comprises a synchronization device PH associated with the first generation means G1 and with the second generation means G2 and suitable for determining the phase of the fundamental component $I_{fund}$ starting with the phase of the mains voltage $V_{grid}$ injected into the power distribution network G and the phase $\theta_{ehj}$ of the harmonic component $I_{ehj}$ of the reference current $I_{ref}$ with respect to the fundamental component $I_{fund}$.

In particular, the synchronization device PH can be made up of a phase-locked loop suitable for generating a synchronization signal in phase with the mains voltage $V_{grid}$.

Usefully, in a preferred embodiment of the system O, the fundamental component $I_{fund}$ of the reference current $I_{ref}$ is in phase with the mains voltage $V_{grid}$.

This way, the mains current $I_{ref}$ will also be in phase with the mains voltage $V_{grid}$ so as to only transfer active power onto the power distribution network G.

The system O also comprises means of verification S suitable for verifying the difference between the reference current $I_{ref}$ to be followed and the output current $I_{out}$ generated by means of the multilevel inverter I.

In particular, these verification means S are schematized in FIG. 2 by means of a negative feedback control that detects the output current $I_{out}$ generated by the inverter I and subtracts it from the reference current $I_{ref}$ coming out of the adding device A.

The method according to the invention is described below. The method comprises:
a phase of generation of a fundamental component $I_{fund}$ of the reference current $I_{ref}$, performed by means of the second generation means G2;
a phase of generation of an even order harmonic component $I_{ehj}$ of the reference current $I_{ref}$ out of phase with respect to the fundamental component $I_{fund}$;
the adding of the fundamental component $I_{fund}$ and the harmonic component $I_{ehj}$, by means of the adding device A, to obtain the reference current $I_{ref}$.

The method according to the invention also comprises a control phase of the multilevel inverter I, performed by means of the control unit U, wherein the multilevel inverter I is piloted for the generation of the output current $I_{out}$ in accordance with the reference current $I_{ref}$.

In particular, the control phase comprises the generation of the control signals $P_a$, $P_b$, $P_c$, $P_d$, pulse width modulated (PWM) and suitable for controlling the first, the second, the third and the fourth switches $S_a$, $S_b$, $S_c$ and $S_d$ respectively of the multilevel inverter I for the generation of the output current $I_{out}$.

Advantageously, the method envisages the detection of the unbalance of the input voltages $V_{bus+}$ and $V_{bus-}$, performed by means of the calculation device D, and the regulation of the amplitude of the harmonic component $|I_{ehj}|$ of the reference current $I_{ref}$, performed by means of the regulation means R, for offsetting the unbalance.

In particular, the unbalance detection phase envisages the calculation of the difference between the input voltages $V_{bus+}$ and $V_{bus-}$ at the heads of the condensers $C_{bus+}$ and $C_{bus-}$.

The method also envisages a synchronization phase of the phase of the fundamental component $I_{fund}$ with the phase of the mains voltage $V_{grid}$ injected into the power distribution network G and a phase of determination of the phase displacement between the fundamental component $I_{fund}$ and the harmonic component $I_{ehj}$ of the reference current $I_{ref}$.

In particular, in a preferred but not exclusive embodiment, such out-of-phase angle is equal to 90°+k*180°, with k equal to any whole number, and the fundamental component $I_{fund}$ is in phase with the mains voltage $V_{grid}$ injected into the power distribution network G.

Finally, it must be pointed out that the system O and the method described above are applicable in exactly the same way if the roles are switched between the current and the mains voltage $I_{grid}$ and $V_{grid}$, i.e., if a mains voltage $V_{grid}$ is set by the multilevel inverter I with an even harmonic component (e.g., a second order harmonic) suitably out of phase with respect to the fundamental component and whose amplitude is adjustable by means of the equalization unit E according to the unbalance between the input voltages $V_{bus+}$ and $V_{bus-}$.

It has in point of fact been ascertained how the described invention achieves the proposed objects.

In particular, the fact is underlined that the injection into the power distribution network of a mains current having an even harmonic component allows performing the offsetting of the phase displacement of the "DC bus voltages" and at the same time eliminating the drawbacks of the state of the art.

The invention claimed is:
1. A system (O) for offsetting an input voltage unbalance in multilevel inverters, comprising at least a control unit (U) operatively associated with at least a multilevel inverter (I) for converting direct current into alternate current, said control unit (U) controlling said multilevel inverter (I) for generating at least an output current ($I_{out}$) depending on at least a reference current ($I_{ref}$), and at least an equalization unit (E) for equalizing input voltages ($V_{bus+}$, $V_{bus-}$) of said multilevel inverter (I) having:

first generation means (G1) of at least a harmonic component ($I_{ehj}$) of order equal to said reference current ($I_{ref}$), out of phase with respect to a fundamental component ($I_{fund}$) of said reference current ($I_{ref}$);

detection means (D) of the unbalance of the input voltages ($V_{bus+}$, $V_{bus-}$) to said multilevel inverter (I);

regulation means (R) of an amplitude ($|I_{ehj}|$) of said harmonic component ($I_{ehj}$) depending on the detected unbalance of the input voltages ($V_{bus+}$, $V_{bus-}$) to said multilevel inverter (I), for offsetting said unbalance of the input voltages ($V_{bus+}$, $V_{bus-}$) to said multilevel inverter (I);

wherein said equalization unit (E) comprises at least an adding device (A) associated with said first generation means (G1) adding said harmonic component ($I_{ehj}$) to said fundamental component ($I_{fund}$) to obtain said reference current ($I_{ref}$).

2. The system (O) according to claim 1, wherein said detection means (D) of the unbalance of the input voltages ($V_{bus+}$, $V_{bus-}$) to said multilevel inverter (I) are associated with at least an input branch (B) to said multilevel inverter (I) having at least two capacitors ($C_{bus+}$, $C_{bus-}$) serially connected, at least a terminal associated with a positive pole ($V_{dc}+$) of a power voltage source (PW) and at least an opposite terminal associated with a negative pole ($V_{dc-}$) of said power voltage source (PW), said input voltages ($V_{bus+}$, $V_{bus-}$) to said multilevel inverter (I) being made up of voltages at the heads of said capacitors ($C_{bus+}$, $C_{bus-}$).

3. The system (O) according to claim 2, wherein said detection means (D) of the unbalance of the input voltages ($V_{bus+}$, $V_{bus-}$) to said multilevel inverter (I) are associated with said input branch (B) and with said regulation means (R) and comprise at least a calculation device (D) calculating a difference between said input voltages ($V_{bus+}$, $V_{bus-}$) to said multilevel inverter (I).

4. The system (O) according to claim 1, wherein said control unit (U) comprises generation means for generating control signals ($P_a$, $P_b$, $P_c$, $P_d$) modulated by pulse width depending on said reference current ($I_{ref}$), controlling at least a first, a second, a third and a fourth switch ($S_a$, $S_b$, $S_c$, $S_d$) of said multilevel inverter (I) for the generation of said output current ($I_{out}$).

5. The system (O) according to claim 1, wherein said harmonic component ($I_{ehj}$) is a second order harmonic.

6. The system (O) according to claim 5, wherein an out-of-phase angle of said harmonic component ($I_{ehj}$) with respect to said fundamental component ($I_{fund}$) is equal to 90*+k*1800, with k equal to any whole number.

7. The system (O) according to claim 1, comprising second generation means (G2) of said fundamental component ($I_{fund}$) of the reference current ($I_{ref}$).

8. The system (O) according to claim 1, wherein said fundamental component ($I_{fund}$) of the reference current ($I_{ref}$) is in phase with a mains voltage ($V_{grid}$) injected on a power distribution network (G) downstream of said multilevel inverter (I).

9. The system (O) according to claim 1, comprising at least a synchronization device (PH) associated with said first generation means (G1), determining the phase ($\theta_{fund}$) of said fundamental component ($I_{fund}$) starting with a phase of the mains voltage ($V_{grid}$) injected on a power distribution network (G) downstream of said multilevel inverter (I).

10. The system (O) according to claim 7, comprising at least a synchronization device (PH) associated with said second generation means (G2), determining the phase ($\theta_{ehj}$) of said harmonic component ($I_{ehj}$) with respect to said fundamental component ($I_{fund}$).

11. A method for offsetting the unbalance of input voltages ($V_{bus+}$, $V_{bus-}$) in multilevel inverters (I), comprising the following steps:

providing a control stage of at least a multilevel inverter (I) for converting direct current into alternate current, in which said multilevel inverter (I) is controlled for generating at least an output current ($I_{out}$) depending on at least a reference current ($I_{ref}$);

generating at least a harmonic component ($I_{ehj}$) of order equal to said reference current ($I_{ref}$), out of phase with respect to a fundamental component ($I_{fund}$) of said reference current ($I_{ref}$);

detecting the unbalance of the input voltages ($V_{bus+}$, $V_{bus-}$) to said multilevel inverter (I);

regulating an amplitude ($|I_{ehj}|$) of said harmonic component ($I_{ehj}$) depending on the detected unbalance of the input voltages ($V_{bus+}$, $V_{bus-}$) to said multilevel inverter (I), for offsetting said unbalance of the input voltages ($V_{bus+}$, $V_{bus-}$) to said multilevel inverter (I);

and adding said harmonic component ($I_{ehj}$) and said fundamental component ($I_{fund}$) to obtain said reference current ($I_{ref}$).

12. The method according to claim 11, wherein said detection step of the unbalance of the input voltages ($V_{bus+}$, $V_{bus-}$) to said multilevel inverter (I) is performed on at least an input branch (B) to said multilevel inverter (I) having at least two capacitors ($C_{bus+}$, $C_{bus-}$) serially connected, at least a terminal associated with a positive pole ($V_{dc}+$) of a power voltage source (PW) and at least an opposite terminal associated with a negative pole ($V_{dc-}$) of said power voltage source (PW), said input voltages ($V_{bus+}$, $V_{bus-}$) to said multilevel inverter (I) being made up of voltages at the heads of said capacitors ($C_{bus+}$, $C_{bus-}$).

13. The method according to claim 12, wherein said detection step of the unbalance of the input voltages ($V_{bus+}$, $V_{bus-}$) to said multilevel inverter (I) comprises the calculation of a difference between said input voltages ($V_{bus+}$, $V_{bus-}$) to said multilevel inverter (I).

14. The method according to claim 11, wherein said control comprises the generation of control signals ($P_a$, $P_b$, $P_c$, $P_d$) modulated by pulse width depending on said reference current ($I_{ref}$), controlling at least a first, a second, a third and a fourth switch ($S_a$, $S_b$, $S_c$, $S_d$) of said multilevel inverter (I) for the generation of said output current ($I_{out}$).

15. The method according to claim 11, wherein said harmonic component ($I_{ehj}$) is a second order harmonic.

16. The method according to claim 11, comprising at least a determination stage of a displacement between said fundamental component ($I_{fund}$) and harmonic component ($I_{ehj}$) of the reference current ($I_{ref}$).

17. The method according to claim 11, wherein an out-of-phase angle of said harmonic component ($I_{ehj}$) with respect to said fundamental component ($I_{fund}$) is equal to 90*+k*1800, with k equal to any whole number.

18. The method according to claim 11, comprising at least a generation stage of said fundamental component ($I_{fund}$) of the reference current ($I_{ref}$).

19. The method according to claim 11, wherein said fundamental component ($I_{fund}$) of the reference current ($I_{ref}$) is in phase with a mains voltage ($V_{grid}$) injected on a power distribution network (G) downstream of said multilevel inverter (I).

20. The method according to claim 11, comprising at least a synchronization stage of the phase of said fundamental component ($I_{fund}$) of the reference current ($I_{ref}$) with the phase of the mains voltage ($V_{grid}$) injected on a power distribution network (G) downstream of said multilevel inverter (I).

\* \* \* \* \*